United States Patent [19]
Vergara

[11] Patent Number: 5,280,742
[45] Date of Patent: Jan. 25, 1994

[54] MUSICAL DRUM WITH LIGHTING EFFECTS

[76] Inventor: Florentino S. Vergara, 2651 Hillsborough Pl., West Covina, Calif. 91792

[21] Appl. No.: 783,500

[22] Filed: Oct. 28, 1991

[51] Int. Cl.⁵ .................... B31C 5/00; G10D 13/02
[52] U.S. Cl. .................. 84/411 R; 84/464 R; 84/414
[58] Field of Search ............... 84/411 R, 411 M, 414, 84/464 R, 464 A, DIG. 12

[56] References Cited

U.S. PATENT DOCUMENTS

| | | | |
|---|---|---|---|
| 3,955,465 | 5/1976 | Zickos | 84/411 R |
| 4,045,264 | 8/1977 | Ludwig et al. | 84/411 R |
| 4,091,706 | 5/1978 | Ludwig | 84/411 R |
| 4,102,236 | 7/1978 | North | 84/411 R |
| 4,173,917 | 11/1979 | Della-Porta | 84/411 R |
| 4,373,419 | 2/1983 | Tuttrup | 84/411 R |
| 4,484,180 | 11/1984 | Deforeit | 84/464 R |
| 4,790,228 | 12/1988 | Thirion | 84/411 R |

Primary Examiner—William M. Shoop, Jr.
Assistant Examiner—Helen Kim
Attorney, Agent, or Firm—Boniard I. Brown

[57] ABSTRACT

A musical drum construction has a drum side wall comprising a relatively thin outer plastic shell or skin and a relatively thick inner foam plastic liner. The drum construction is of relatively light weight and is economical to manufacture. A fluctuating light source is provided in the drum to impart a glowing appearance to the drum exterior. Switch mechanisms on the drum respond to vibrational motion of the drum skin to control the light source, the light or lights going on and off at the frequency with which the drum skin is struck by a drumstick.

8 Claims, 3 Drawing Sheets

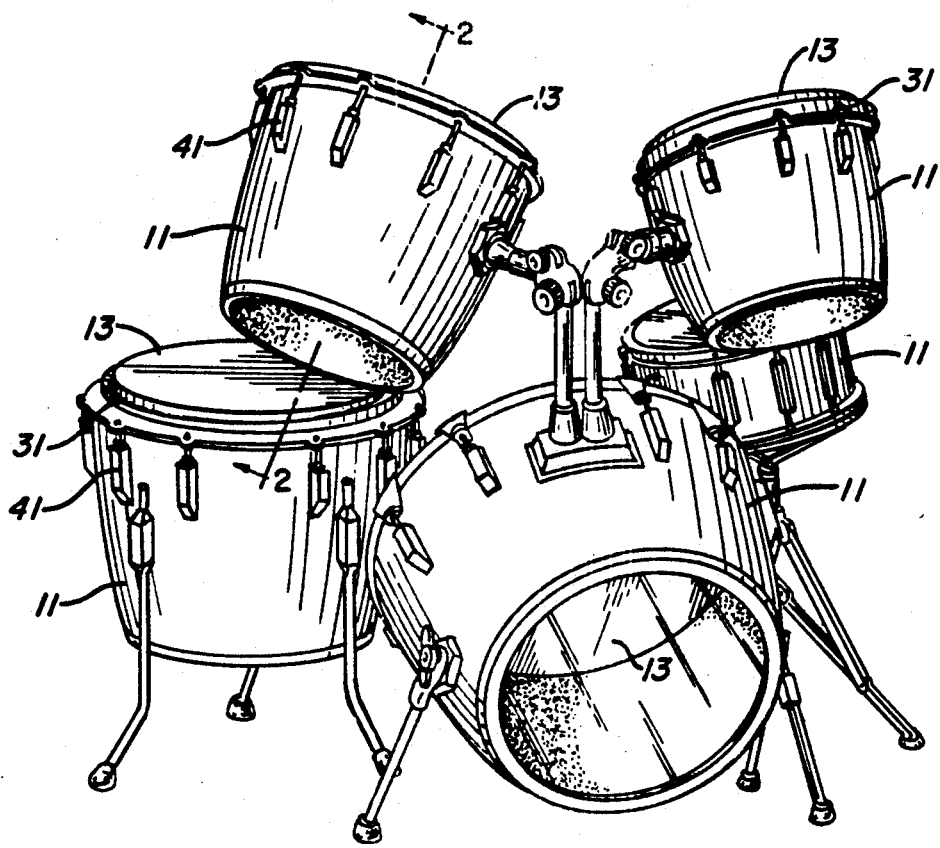
FIG.—1
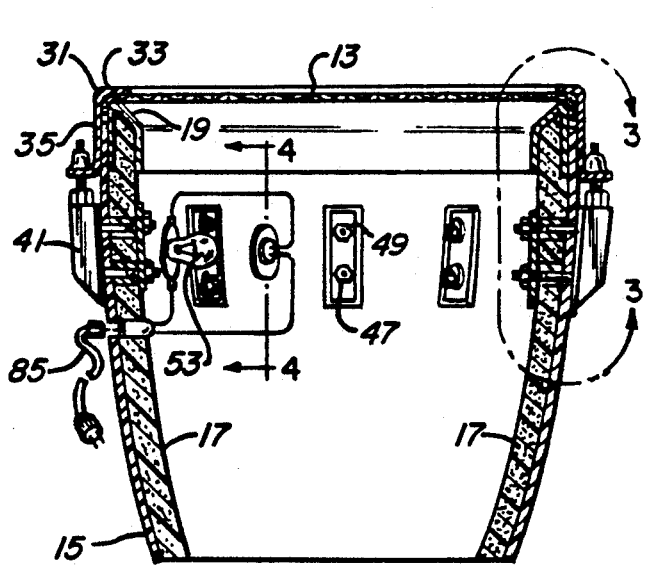
FIG.—2
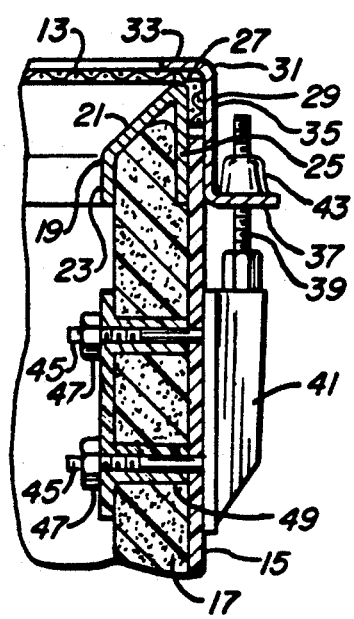
FIG.—3

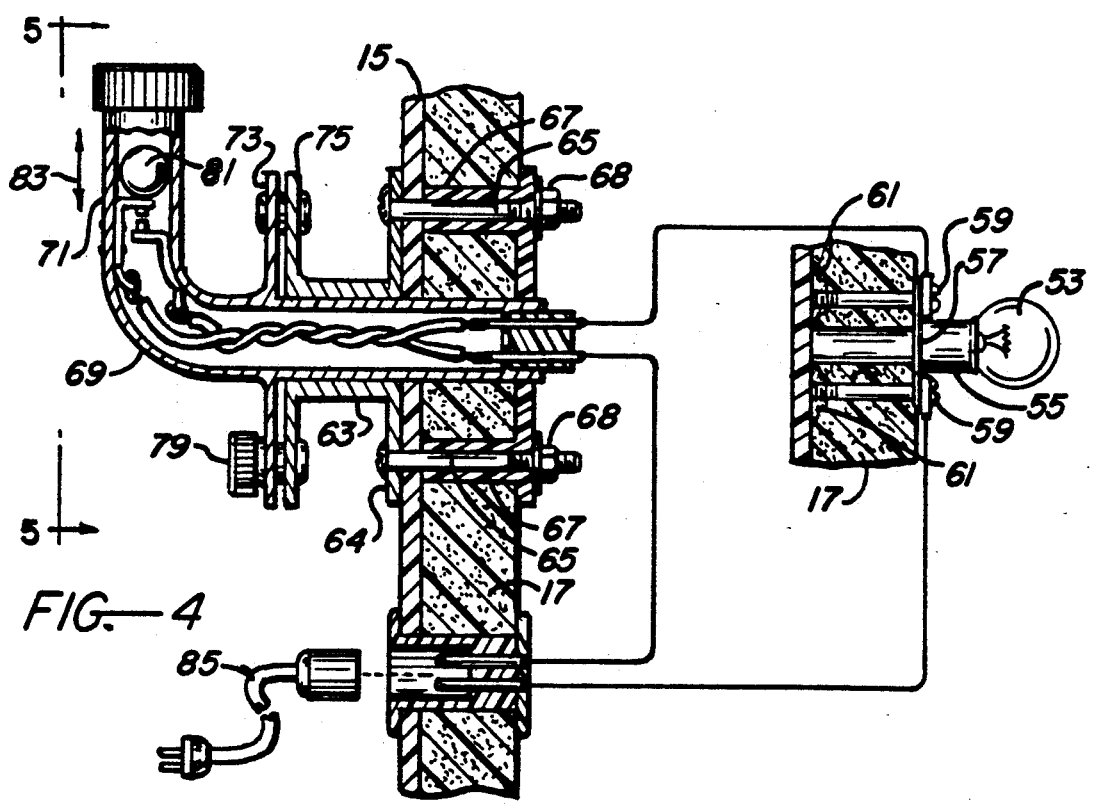
FIG.—4
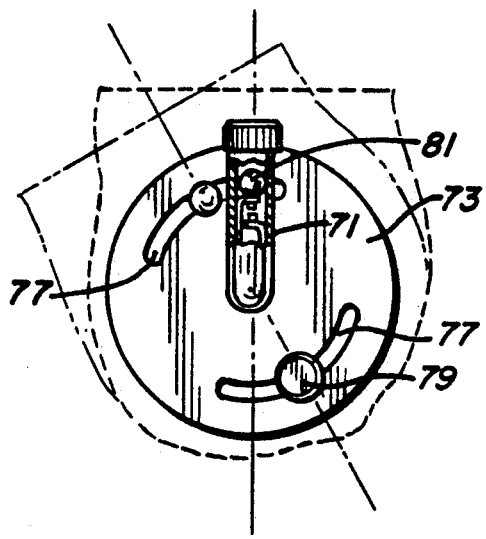
FIG.—5
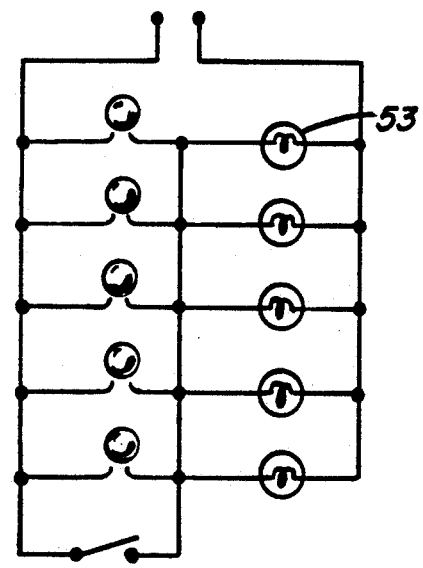
FIG.—6

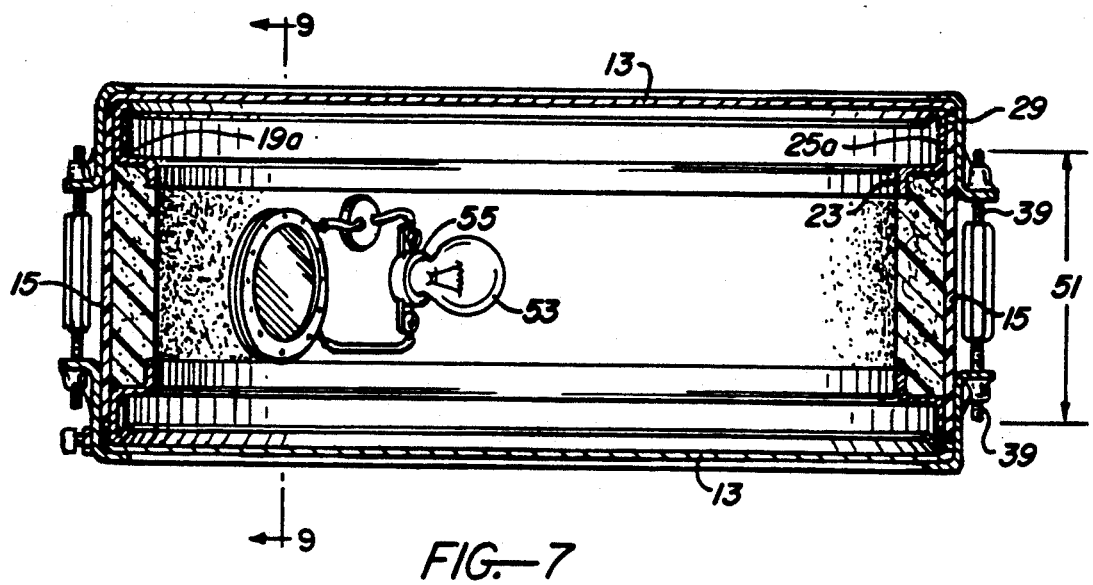
FIG.—7
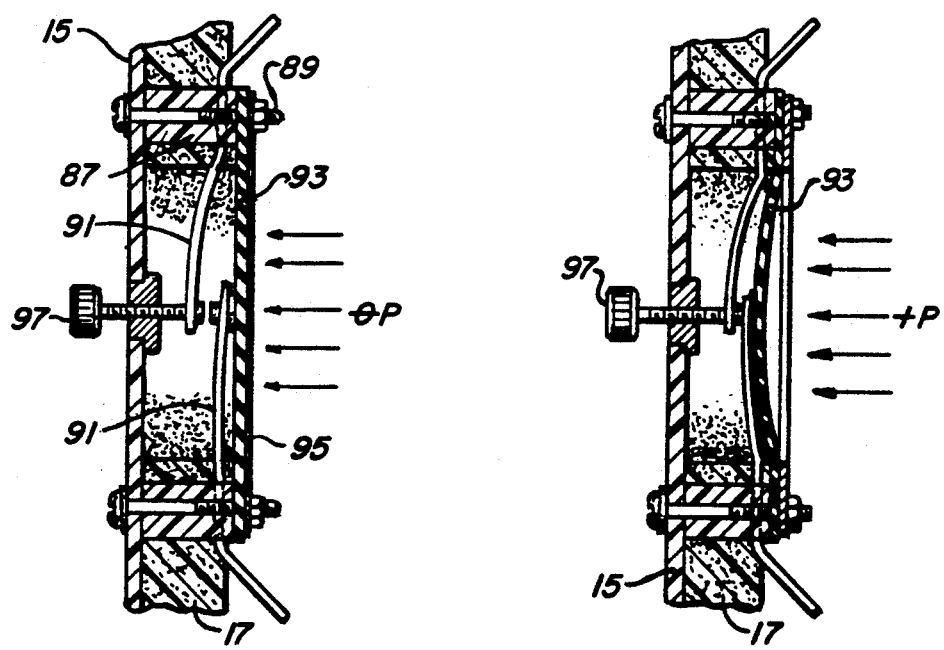
FIG.—8  FIG.—9

MUSICAL DRUM WITH LIGHTING EFFECTS

BACKGROUND OF THE INVENTION

1. Field of the Invention

The present invention relates to musical instruments, and particularly percussion drum instruments. The invention is applicable to various types of musical drums, including snare drums, kettledrums, bass drums and tenor drums. The drum may be a so-called closed drum structure having two drum skins, one at each end of the drum shell. Alternately, the drum may be a so-called open drum structure having only a single drum skin at one end of the shell, the other end of the shell being open.

2. Prior Developments

Conventional drums commonly comprise a hollow cylindrical shell having a circular drum skin stretched taut over one or both of its ends. A clamping ring is attached to the shell to exert axial clamping force on peripheral edge areas of each drum skin, thus to clamp the drum skin to the shell.

The musical output of the drum is produced by vibrational motion of the drum skins resulting from the striking action of a drumstick on the outer surface of a drum skin. In the case of a drum having skins at both of its ends, the vibrational motion of one skin is imparted to the other skin via a pressure wave generated in the air trapped within the drum between the two skins.

Drum shells are commonly made of wood, resulting in a relatively heavy and expensive construction. It is particularly expensive to form a tapered or bowl-shaped shell of wood. Although drum shells may be formed of plastic, conventional plastic shells are generally heavy gage constructions having relatively thick walls. The drums of the present invention have shells of relatively light and inexpensive structure.

Drums are often arranged in groups or sets called trap sets. Often, the drums are played by drummers as part of a rock band or combination. Lighting displays are often associated with the musical presentation. An interesting type of lighting display can be achieved by coordinating a light-producing action with the drum striking action. Each drumbeat can produce one flicker of an ornamental light associated with the drum. The overall effect is a flickering light display having a light frequency related to the drumbeat frequency.

The invention contemplates relatively low cost, light weight drum structures equipped with ornamental light displays.

SUMMARY OF THE INVENTION

The present invention relates to a drum structure having an outer annular shell formed of thin flexible plastic material, and an inner thicker rigid annular liner formed of a rigid plastic foam material, e.g., styrofoam. The outer shell presents a smooth, attractive, glossy outer surface which is ornamentally attractive. The inner liner rigidifies and reinforces the outer shell without adding significant extra weight to the drum structure.

A drum so constructed can be relatively light and adapted for easy carrying, manipulation and transport. Because the outer shell is formed of light gage plastic material, it comprises only a small amount of material, and thus can be manufactured at relatively low cost. The rigid plastic foam liner is also relatively low cost, and light weight. With the rigid foam liner installed with the thin flexible shell, the resultant drum structure has a desirable combination of lightness, rigidity, and good hoop strength.

The foam liner is reinforced at one or both ends with an annular hoop formed of a hard rigid material, e.g., steel or aluminum. Aluminum is preferred to minimize the overall weight of the drum structure. The annular hoop has axial flanges extending along the inner and outer surfaces of the plastic foam liner, the axial end portions of the liner telescoping into the annular space formed by the hoop flanges.

The hoop forms a hard annular seating surface for an associated drum skin. Clamping rings on the drum structure exert axial clamping forces on peripheral areas of the skin, whereby the skin is clamped between the hoop and the clamping ring. The hoop shields the end edges of the foam plastic liner, thereby protecting the relatively soft surface of the foam plastic from deformation or degradation by the clamping force of the clamping ring. The invention utilizes the lightness and low cost of the foam plastic for reinforcing a thin outer annular ornamental shell, while still providing a hard non-deformable annular seating surface for the drum skin.

Drums of the present invention preferably have one or more lamps or lights mounted therein, whereby the drum skins are illuminated from within the drum. Drum skins are normally formed of a thin plastic material which has a certain translucence. Light rays generated within the drum are diffused by the translucent drum skin, so that essentially the entire drum skin takes on a glowing appearance.

Preferably, each light within a given drum is controlled by switch means responsive to vibrational motion of the drum skin, whereby the generated light frequency is related to the frequency at which the drum skin is struck by a drumstick. The switch means may be an inertia switch operated by slight axial motions of the drum shell resulting from vibrational motion of the drum skin. Alternately, the switch means may be a diaphragm switch operated by variations in pressure of the air trapped within the drum. Such air pressure variations are automatically produced by a drumstick striking the drum skin of the drum.

BRIEF DESCRIPTION OF THE DRAWINGS

FIG. 1 is an elevational view of a drum arrangement or trap set utilizing individual drums constructed according to the present invention;

FIG. 2 is a sectional view taken on line 2—2 in FIG. 1;

FIG. 3 is an enlarged fragmentary sectional view taken as indicated by arrows 3—3 in FIG. 2;

FIG. 4 is a fragmentary sectional view taken on line 4—4 in FIG. 2;

FIG. 5 is a fragmentary view taken on line 5—5 in FIG. 4;

FIG. 6 is a schematic electrical diagram of a light energization system utilized in the drum set of FIG. 1;

FIG. 7 is a sectional view taken through a snare drum embodying features of the invention;

FIG. 8 is a fragmentary sectional view taken on line 8—8 in FIG. 7; and

FIG. 9 is a view similar to that of FIG. 8, showing a switch in an actuated condition resulting from an air pressure pulse generated within the drum.

DESCRIPTION OF A PREFERRED EMBODIMENT OF THE INVENTION

Referring to the drawings, FIG. 1 shows five drums arrayed together for operation by a person seated in a position facing the drum array. Each drum comprises an annular side wall 11 and a drum skin 13 closing the upper end of the side wall. The lower end of the side wall of each drum is open.

FIG. 7 illustrates another drum construction wherein the drum annular side wall is closed at each end by a drum skin 13. The present invention is applicable to either type of drum construction, the open type drum of FIG. 1 or the closed type drum of FIG. 7.

As shown in FIGS. 2 and 3, the drum side wall comprises an outer annular shell 15 formed of thin flexible plastic material. The plastic material may be a thin molded sheet having a thickness of about 0.1 inch or more, depending on drum diameter. The sheet may contain strengthening glass fibers. However, the sheet is flexible and non-rigid. The shell preferably has a smooth, lustrous, glossy outer surface.

Disposed within thin shell 15 is a rigid annular liner 17 formed of plastic foam material. The foam material may be a commercially available styrofoam or polyethylene foam having a plastic formulation whereby the liner has rigidity in its as-formed state, i.e., the liner is self-standing and non-deformable. Liner 17 has a wall thickness appreciably greater than the wall thickness of outer shell 15—e.g., the liner wall thickness may be about one-half inch or more, depending on the drum size.

Liner 17 can be foamed in place, using shell 15 as an outer mold surface. Alternately, liner 17 may be formed separately and then inserted into shell 15 in a snug fit. An adhesive may be employed between the engaged surfaces of the shell and liner to form a unitary laminated structure. When the shell and liner are laminated together, the resulting structure is rigid and non-deformable, even though the shell is relatively flexible. The rigid foam liner acts as a rigid reinforcement for shell 15.

The end edges of foam liner 17 are relatively soft and therefore they cannot be used directly for clamping the associated drum skin 13 to the drum side wall (15, 17). Therefore, an annular hoop 19 is telescoped over the upper end edge of the foam liner. Hoop 19 is formed of a relatively hard, rigid material, such as steel or aluminum.

FIG. 3 shows one hoop cross section that may be utilized. FIG. 7 shows another hoop cross section which may be employed. As shown in FIG. 3, the hoop cross section includes a web portion 21, an inner flange 23 and an outer flange 25. Flanges 23 and 25 extend axially parallel to the central axis of the liner. Web portion 21 is inclined relative to flange 25 to form a V cross-sectioned skin-engagement surface 27. Skin 13 has a preformed peripheral flange 29 which fits down about flange 25.

The surface of foam liner 17 is relatively soft and deformable so that hoop 19 can be forced axially onto the end edge of the liner to telescope over the liner edge, as shown in FIG. 3. Alternately, hoop 19 may be employed as an insert in the mold used to initially form the foamed plastic liner.

Drum skin 13 is clamped against hoop 19 by a clamping ring 31. The clamping ring has an L-shaped cross section, including a radial leg or flange 33 and an axially-extending leg 35. The lower end portion of leg 35 may be outturned, as at 37, to reinforce the clamping ring and provide ears for accommodating threaded studs 39.

Circumferentially spaced about shell 15 are anchoring blocks 41. A threaded stud 39 extends from each block 41 through the outturned flange 37 of ring 31 so that an associated nut 43 can be threaded onto each stud to draw ring 31 axially into clamping engagement with drum skin 13.

Each anchoring block 41 has two threaded studs 45 extendable through shell 15 and foam liner 17. Nuts 47 are threaded onto the studs rigidly to clamp the associated block 41 to shell 15. A rigid spacer means 49 is arranged between each nut 47 and the inner surface of shell 15, whereby the clamping force is transmitted from each nut 47 through the spacer to the shell and not through the soft foam liner.

Spacer means 49 may comprise two plastic sleeves and a flat plate abutting the associated ends of the sleeves. The spacer means is designed to transmit the nut clamping force to shell 15, while protecting the soft foam liner and maintaining the clamp connection against looseness.

FIG. 7 shows an alternate hoop cross section wherein the outer axially extending flange 25a of the hoop extends axially beyond the axial profile dimension 51 of shell 15. The outer V-shaped end edge of flange 25a constitutes a skin-engagement surface. In both forms of the invention, shown in FIGS. 3 and 7, the skin-engagement surface is a relatively thin annular edge surface having a small total surface area for enhanced clamping force. The outer flange 25 or 25a of the hoop cross section provides an axial space beyond the end edge of shell 15 in which to accommodate the peripheral flange 29 of drum skin 13. Flange 29 encircles the axially projecting portion of flange 25 or 25a.

Both forms of the invention include one or more electric lamps or lights 53 within the space circumscribed by foam liner 17. Each light 53 is supported in a socket 55 attached to foam liner 17, but not to shell 15. As shown in FIG. 4, light socket 55 has ears or flanges 57 seating against the exposed face of foam liner 17. The ears may take the form of an annular flange to provide increased seating area on the foam liner. Two or more screws 59 extend through the ears and the foam wall into nuts 61 located on the outer surface of the foam liner. The nuts may be flanged to increase resistance against undesired pull-through action through the foam material. The nuts can be molded in the foam wall.

Because the nut-screw attachment means does not penetrate shell 15, the light is substantially isolated from shock forces associated with vibrational motion of the shell. The soft foam liner tends to cushion or isolate the light filament against potentially destructive effects of shell vibration resulting from the beating action of the drumstick on skin 13.

Each electric light is preferably controlled by switch means responsive to vibrational motion of the drum skin 13. The switch means is arranged to open and close at the same frequency as that of the drumstick beating on skin 13. Depending on the nature of the switch, either normally open or normally closed, the light will be illuminated during or just after each beat of the stick on the drum skin.

The light-control switch of FIG. 4 is an inertia switch utilizing a weighted ball as the switch operator. The light-control switch shown of FIGS. 8 and 9 is a diaphragm switch responsive to air pressure fluctuations within the space enclosed by the drum of FIG. 7.

Referring to FIGS. 4 and 5, the switch housing comprises a tube 63 having a flanged area 64 seated against the outer face of shell 15. Screws 65 extend through flange 64 and a spacer means 67 located within foam liner 17. Nuts 68 are threaded onto the screws to clamp tube 63 to shell 15 without deforming the foam liner material or otherwise producing a loss in the clamp force. The action is similar to that described relative to the mounting of light 53.

A curved tube 69 is adjustably telescopically mounted onto tube 63 so that the upright portion 71 of the curved tube may have a generally vertical orientation even though the drum axis may be tilted, as with some of the drums shown in FIG. 1.

Flange 73 of the curved tube fits against flange 75 on tube 63. Curved slots 77 are provided in flange 73 so that the associated clamp screw 79 can be tightened with the flanges in various different positions of rotational adjustment, as necessary to have the upright portion of tube 69 vertical.

The switch is operated by a weighted ball operator 81 which is arranged to reciprocate in the arrow 83 direction in response to axial vibrational motion of shell 15, resulting from repetitive striking of the drumstick against the drum skin. The switch contacts are electrically connected to the electrical light 53 and an electric current source, shown as a conventional extension cord 85 (FIG. 4). One or more batteries may also serve as an electrical power source.

FIGS. 8 and 9 show a diaphragm type switch means responsive to air pressure variations within the drum interior space. The diaphragm switch is usually only with closed-type drums wherein both ends of a drum are closed to provide a trapped body of air. The illustrated switch means comprises an annular housing 87 clamped to shell 15 by screw-nut means 89. The side wall of housing 87 acts as spacer means to isolate the foam liner material from the clamp force. Two leaf contacts 91 are molded to the housing. A diaphragm operator 93 is clamped at its peripheral edge by an annular clamp plate 95. FIG. 8 shows the switch contacts in an open condition. The pressure on the right face of diaphragm 93 is relatively low. FIG. 9 shows the switch contacts closed by a relatively high pressure condition on the right face of diaphragm 93.

Variations in air pressure on the right face of diaphragm 93 result from the beating action of the drumstick on the drum skin. As the skin 13 deflects inwardly along the drum axis, the confined space is slightly decreased, thus increasing the pressure within the drum space. As the skin rebounds outwardly, the pressure within the drum decreases slightly. Such air pressure variations open and close the switch contacts, to produce a fluctuation in the output of the associated light 53 (FIG. 7). The diaphragm flexure or stroke necessary to operate the switch can be varied by a set screw means 97.

Thus there has been shown and described a novel musical drum with lighting effects which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only be the claims which follow.

The inventor claims:

1. A musical drum comprising:
   an annular shell of a thin flexible plastic material, said shell having an axis and a wall with an annular concave inner surface and a convex outer surface,
   a rigid annular liner formed of a rigid plastic foam material, said liner having an annular convex outer surface and a concave inner surface, the liner convex surface being in facial engagement with the shell concave surface to reinforce the shell, said shell and liner defining an annular drum having an open end,
   a flexible drum skin spanning and engaged about the annular drum end,
   clamping means securing the drum skin about said annular drum end,
   at least one electric light means located within the space circumscribed by the foam liner, and
   switch means responsive to vibrational motion of the drum skin for controlling energizing current to the light means.

2. The musical drum of Claim 1, wherein said light means comprises:
   a light socket having ear means positioned on the inner surface of the foam liner, and
   screw-nut means extending through the ear means and the shell to rigidly attach the light socket to the liner, said screw-nut means extending through the liner but not into the shell to reduce subjection of the light means to shock forces associated with vibrational motion of the shell.

3. The musical drum of claim 1, wherein:
   said switch means is an inertia switch having an inertia element and being mounted on said annular shell for actuation in response to axial motion of the shell resulting from the beating action of a drumstick on the drum skin.

4. The musical drum of claim 3, and further comprising:
   means for adjustably mounting said inertia switch on the shell so that the inertia element has motion in a vertical direction even when the shell axis is not vertical.

5. The musical drum of claim 1, wherein:
   said switch means has a diaphragm portion and is mounted on the annular shell, with the diaphragm portion of the switch exposed to the space circumscribed by the foam liner.

6. The musical drum of claim 5, wherein:
   the switch means is a diaphragm switch having contacts with spacing therebetween closeable by a diaphragm stroke, and further including
   means for adjusting said spacing between said contacts in the diaphragm switch to vary the diaphragm stroke required to operate the switch.

7. The musical drum of claim 6, wherein:
   said adjusting means is a set screw accessible exteriorly of the drum.

8. The musical drum of claim 1, wherein said switch means comprises:
   a switch mounting portion extending through the foam liner into abutment with the inner surface of said shell,
   a plurality of screws extending through the shell wall and switch mounting portion, said screws being secured by nuts and
   a clamping nut threaded on each nut, to apply clamping force directly through the screws, said mounting portion acting as a spacer between the shell wall and the clamping nuts to prevent application of clamping force to the foam liner.

* * * * *